United States Patent [19]
McCarthy et al.

[11] 3,731,574
[45] May 8, 1973

[54] APPARATUS FOR CUTTING LENGTHS OF CONVOLUTED PICKET WIRE FROM A CONTINUOUS STRAND THEREOF

[75] Inventors: Paul McCarthy; John F. Nelson, both of Concord, Calif.

[73] Assignee: United States Steel Corporation, Pittsburgh, Pa.

[22] Filed: Dec. 6, 1971

[21] Appl. No.: 208,718

[52] U.S. Cl. ..................83/558, 83/560, 83/598, 83/606, 83/612, 83/699, 83/907
[51] Int. Cl. ..............................................B26d 5/02
[58] Field of Search..................83/558, 555, 556, 83/560, 598, 606, 612, 699, 907; 140/1, 71 C, 139, 140

[56] References Cited
UNITED STATES PATENTS
1,976,686   10/1934   Wunderlich....................83/907 X Primary Examiner—Frank T. Yost
Attorney—Donald S. Ferito

[57] ABSTRACT

Apparatus includes a pair of shear heads mounted astride a continuous length of convoluted picket wire for linear movement toward and away from the strand. Each of said shear heads being provided with a rotatable cutting blade and a fixed cutting blade positioned to engage a common convolution of the strand at two separate points and cutting away a portion of the convolution to cut away a length of picket wire from the strand when the rotatable cutting blades are rotated. Such cutting operation simultaneously forming a tail end on the length of wire cut away from the continuous strand and a head end on the leading end of the continuous strand.

11 Claims, 14 Drawing Figures

PATENTED MAY 8 1973

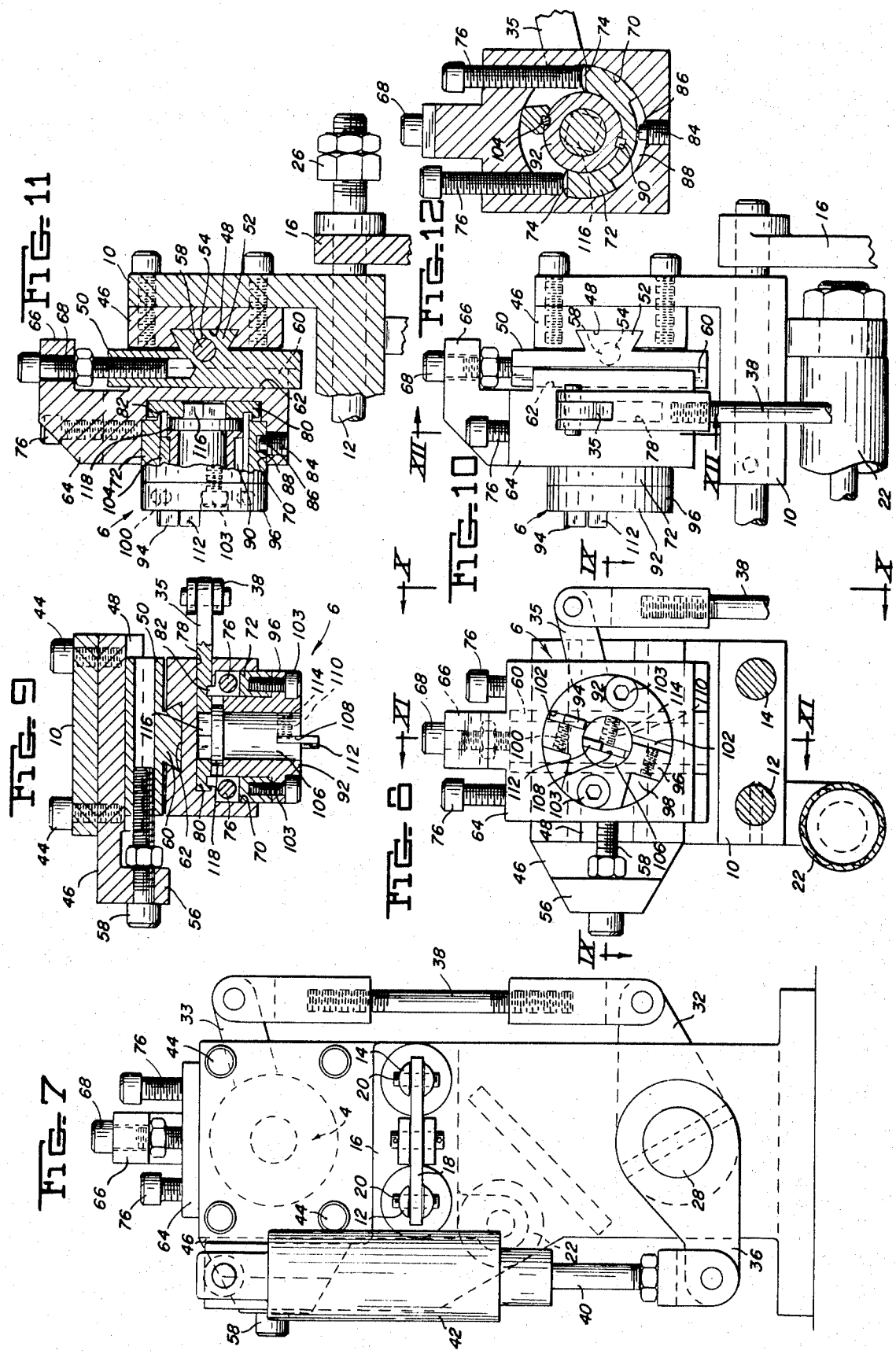

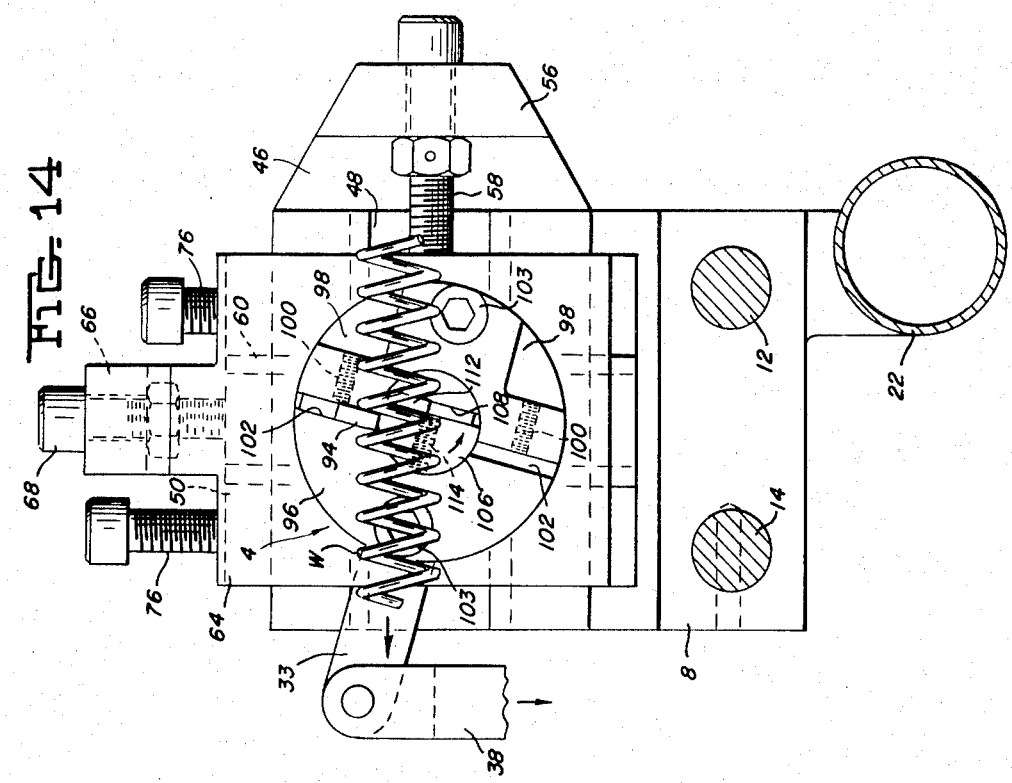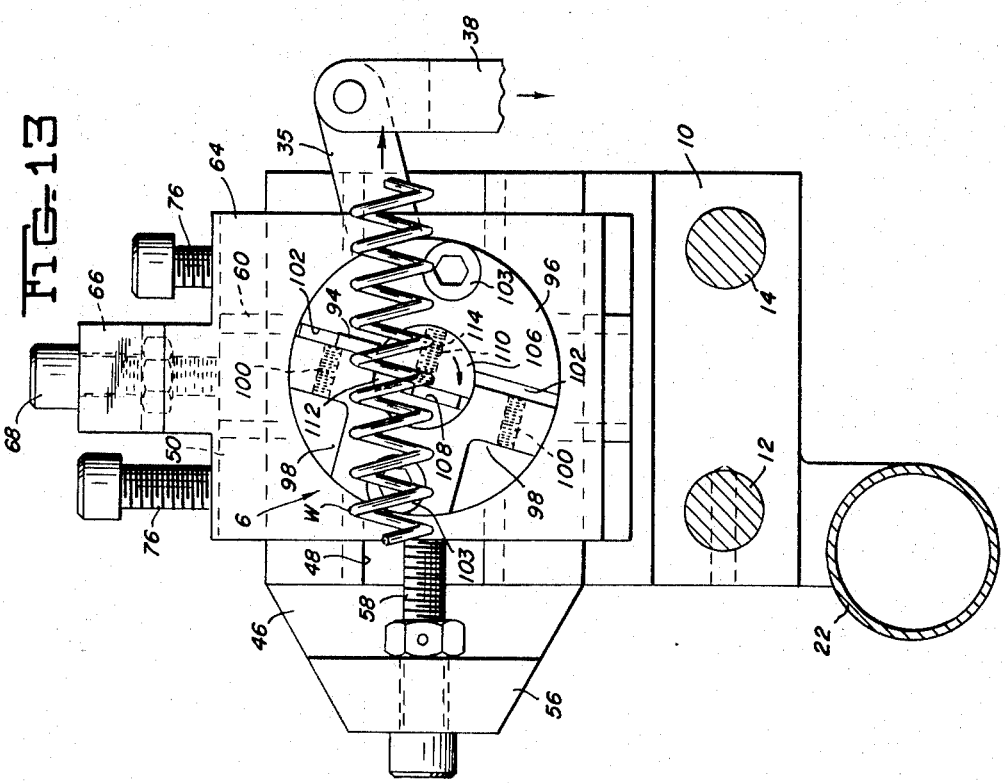

APPARATUS FOR CUTTING LENGTHS OF CONVOLUTED PICKET WIRE FROM A CONTINUOUS STRAND THEREOF

In the manufacture of conventional wire belting, a plurality of spiral wound picket wires are joined together by means of connector cross wires which may be straight or crimped and which pass through the convolutions of two adjacent pickets, as shown in FIG. 2. It is essential that each of the picket wires be shaped with the same number of convolutions so that the selvages of the belting will be uniform. The ends of each of the picket wires must be shaped to provide a curved portion for engagement with and welding to the ends of the cross wires. The curved portions on the opposite ends of a single picket wire must extend in diametrically opposite directions so that the picket wire properly engages the ends of the cross wire to which it is attached. These ends of the picket wire are termed "head" and "tail" ends in the art. The curved end portions must be long enough to engage the cross wire but not so long as to extend excessively beyond the cross wire.

Prior to our invention, the spiral picket wires were made with more convolutions than necessary for a given width of belting and then the extra convolutions were trimmed off by manual operation to provide the proper head and tail formations after the belting was assembled. This, of course, required excessive time in manufacturing the belting and resulted in excessive waste and high production costs.

In order to eliminate the foregoing disadvantages, we propose a novel power-operated shear which operates to produce the desired end formations on each picket wire speedily and without excessive waste prior to assembly of the belting. This is done by cutting out a portion C of one convolution in a continuously formed picket wire W formed by a picket forming die D to cut off a single picket of proper length. Simultaneously, the same cutting operation forms the tail end on the picket cut to length and the head end on the leading end of the next portion of the continuous picket wire, as best shown in FIG. 1.

It is, accordingly, the primary object of our invention to provide a unique and improved apparatus for cutting picket wires having the desired number of convolutions and suitable head and tail formations from a continuous length of spirally wound picket wire.

It is a more specific object of our invention to provide a unique and improved apparatus as set forth by the above-stated object including a power-operated shear having two retractable shear heads each provided with a stationary and a movable cutter blade. The shear heads are disposed opposite each other, one on either side of the path of the advancing continuous picket wire for movement toward and away from the picket wire normal to the longitudinal axis of the picket wire. Each head consists of a housing having the stationary cutter attached thereto and a rotatable member in the housing having the movable cutter attached thereto. In operation the two heads are advanced toward and engage the picket wire after its advancing movement has been stopped. Then the rotatable members of each shear head are rotated simultaneously causing the movable cutter blades of each head to cooperate with its respective stationary cutter blade to cut a portion of a convolution of the picket wire.

These and other objects will become more apparent after referring to the following specification and attached drawing, in which:

FIG. 7 is an elevational view looking at the right side of FIG. 3;

FIG. 8 is a vertical sectional view taken substantially along the line VIII—VIII of FIG. 3;

FIG. 9 is a cross-sectional view taken substantially along the line IX—IX of FIG. 8;

FIG. 10 is an elevational view taken substantially along the line X—X of FIG. 8;

FIG. 11 is a vertical sectional view taken substantially along the line XI—XI of FIG. 8;

FIG. 12 is a vertical sectional view taken substantially along the line XII—XII of FIG. 10;

FIG. 13 is an elevational view partly in section taken substantially along the line XIII—XIII of FIG. 5; and FIG. 14 is an elevational view partly in section taken substantially along the line XIV—XIV of FIG. 5.

Figure 1:
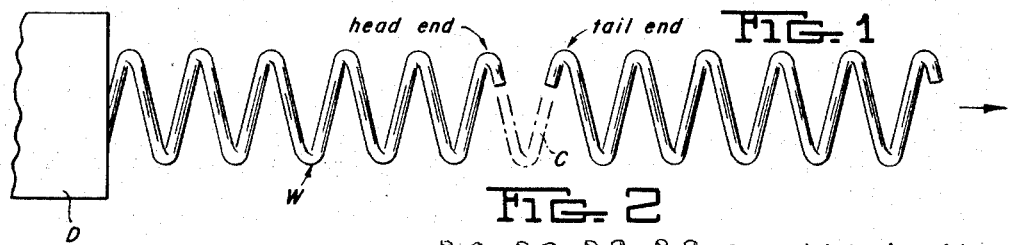
FIG. 1 is an elevational view of a continuous strand of convoluted picket wire showing by broken lines the portion thereof cut away by the apparatus of the invention.
Figure 2:
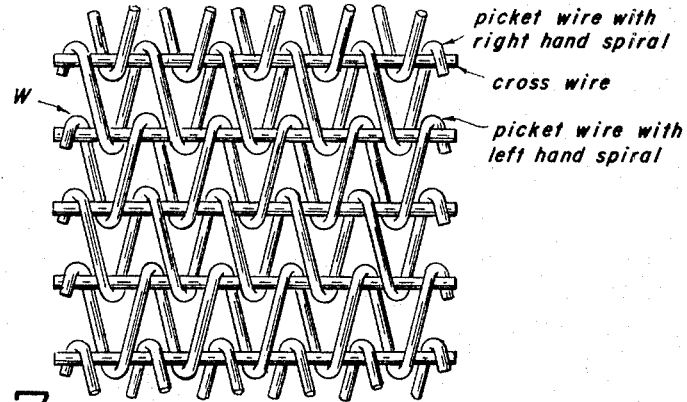
FIG. 2 is a plan view of one type of conveyor wire belting formed with alternately spirally wound picket wires connected together by straight cross wires.

Referring more particularly to the drawing, reference numeral 2 designates generally the shear of the invention which comprises a pair of shear heads 4 and 6 disposed astride the pathway of a continuous length of spirally wound picket wire W. The shear heads 4 and 6 are fixedly mounted on substantially L-shaped brackets 8 and 10, respectively. Bracket 8 is fixedly attached to a guide rod 14 while bracket 10 is fixedly attached to a guide rod 12. Bracket 8 is slidable along guide rod 12 while bracket 10 is slidable along guide rod 14. Guide rods 12 and 14 are slidably mounted in a frame 16. Movements of the guide rods relative to each other are equalized by a link 18 which is pivotally mounted at its center on a projection of the frame 16. The link 18 is pivotally connected with rods 12 and 14 by means of pins 20, one of which projects from each rod.

A fluid pressure cylinder 22 having a piston rod 24 slidable therein is attached with the projecting end of its piston rod connected with bracket 8 and its head end connected with the bracket 10. Actuation of the cylinder causes longitudinal movement of the guide rods and the brackets attached thereto. In movement of the guide rods the bracket fixedly attached to one guide rod slides along the other guide rod and vice versa.

A stop nut 26 is adjustably threaded on one end of the guide rod 12 to limit movement of both guide rods in one longitudinal direction. The stop nut 26 is adjusted to limit movement of the brackets and shear heads inwardly toward the path of the picket wire W in accordance with the size and configuration of the wire W being processed.

A shaft 28 is mounted for rotation in bearings 30 which are part of the frame 16. Three levers 32, 34, and 36 are fixedly attached by one end to the shaft 28 in spaced relation to each other. The free ends of levers 32 and 34 are connected with levers 33 and 35 projecting from shear heads 4 and 6, respectively, by means of adjustable connecting rods 38. The free end of lever 36 is attached to the projecting end of a piston rod 40 of a fluid pressure cylinder 42. Cylinder 42 is pivotally mounted in vertical disposition on the frame 16. Actuation of cylinder 42 causes rotation of shaft 28. Rotation of shaft 28 causes rotation of the movable shear blades as will become apparent hereinafter.

Inasmuch as each shear head is similar in structure and functions in similar manner, only one shear head 6 and its mode of functioning will be described in detail hereinafter.

Figure 3:
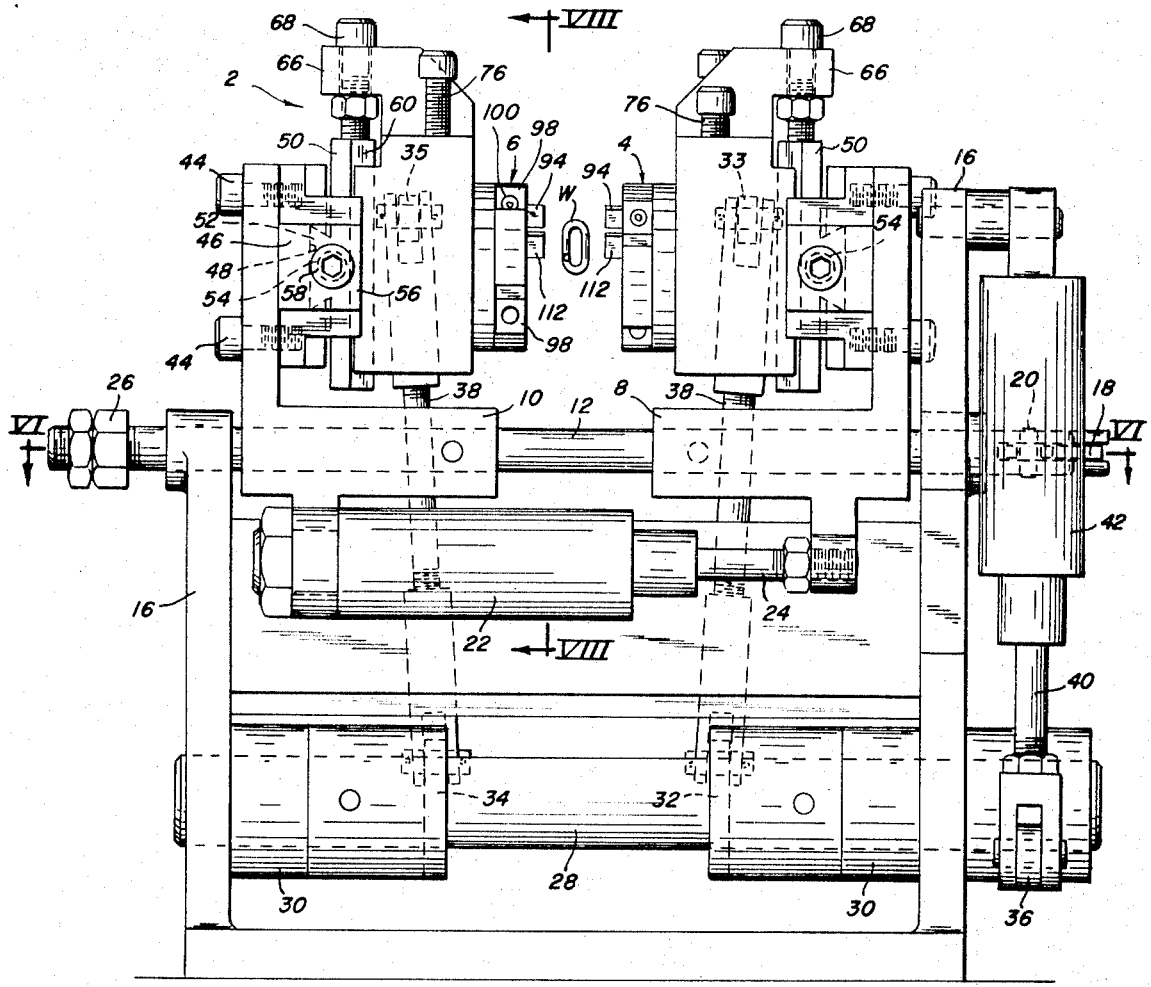
FIG. 3 is a front elevational view of the apparatus of the invention.

Shear head 6 is affixed to the vertical leg of bracket 10 by means of cap screws 44. A plate 46 is interposed between the shear head and the bracket 10. As best shown in FIGS. 3, 10 and 11, the surface of the plate 46 remote from the bracket 10 has a dovetail way 48 formed therein which extends parallel with the path of the advancing picket wire W. A plate 50 having a dovetail 52 projecting from one surface thereof slidably fitting in dovetail way 48 is formed with a tapped hole 54 extending through the dovetail 52 portion thereof and is adjustably attached to a flange 56 formed on one end of plate 46 by means of a fixed screw shaft 58, as best shown in FIG. 9.

Plate 50 is formed with a second dovetail 60 which is at right angles to and on the side of plate 50 opposite dovetail 52, see FIG. 9. Dovetail 60 fits in a dovetail way 62 for movement therealong formed in the surface of the main body 64 of the shear head. The main body 64 is formed with a flange 66 which overhangs plate 50 and accommodates one end of a screw shaft 68. Rotation of shaft 58 causes the main body 64 of the shear head to adjustably move horizontally parallel with the path of the advancing picket wire W while rotation of screw shaft 68 causes vertical adjustable movement of the main body 64 relative to the path of the advancing picket wire W. These adjustable movements are necessary to adjust the shear head in position to properly cut the picket wire notwith-standing the pitch of the picket wire when its advancement is stopped for cutting. These adjustable movements are also necessary to accommodate various wire sizes and convolutions.

The main body 64 is formed with an opening 70 for rotatably receiving a hollow substantially cylindrical member 72. A portion of the member 72 projects beyond the side of the main body 64 remote from the plate 50. A portion of the circumference of the inward end of the member 72 is cut out to form bearing surfaces 74. A pair of adjusting screws 76 are threaded through the main body 64 and bear against the bearing surfaces 74. Thus, threaded adjustment of the screws 76 makes possible circular adjustment of the member 72.

A slot 78 is provided in the side of the main body 64 which communicates with the opening 70 and is utilized for passage of the end 80 of the lever 35. The end 80 of the lever 35 is held in position and guided by spaced lands 82 formed on the inward end of the member 72 which fit into grooves on the end 80 of lever 35, as best shown in FIGS. 8 to 11. The opposite end of the lever 35 projects outwardly of the main body 64 through the slot 78 to its connection with connecting rod 38.

The member 72 is retained in the opening 70 by means of a set screw 84 having a "half-dog" point 86 formed on its inner end which is slidably received in slot 88 which extends partially around the outer circumference of the member 72.

The inner periphery of the member 72 is formed with opposing keyways 90 which extend along the length of member 72.

The carrier 92 of the fixed cutter blade 94 is in the form of a tube having a circumferential flange 96 around one end. Portions of the flange 96 are cut away as at 98 (see FIGS. 8 and 13) and the portions of the flange adjacent the cut-away areas are each drilled and tapped to receive a set screw 100. Opposed notches 102 are formed on the face of the flange 96 remote from the tube portion of the carrier 92. The notches 102 do not extend radially from the center of the flange but extend parallel with a diametric plane through the flange slightly offset therefrom, as best shown in FIGS. 8 and 13. Each set screw 100 functions to retain a fixed cutter blade 94 in the notch. Only one notch carries a cutter blade during operation of the shear head 6. The second notch is provided in the carrier for use when it is used in the shear head 4.

Carrier 92 is retained in member 72 by means of a pair of cap screws 103 and is prevented from rotating relative to member 72 by means of a key 104 projecting from the outer surface of the tubular portion of the carrier 92 and engaging one of the keyways 90.

The carrier 106 for the movable cutter blade is in the form of an elongated cylindrical shaft having a transverse notch 108 communicating with a tapped hole 110 which extends normal to the notch 108. The movable cutter blade 112 is received in the notch 108 and retained therein by a set screw 114 threaded into the hole 110. The opposite end of the carrier 106 is shaped in the form of a projecting square head 116. A collar 118 surrounds the cylindrical shaft adjacent the square head 116. The carrier 106 is fitted into the tube portion of the carrier 92 with the collar 118 abutting the inward end of the carrier 92. The square head 116 fits into a square opening in the inner end of the lever 35. The collar 118 engages the inner end 80 of the lever 35 surrounding its square opening to thereby limit inward movement of the carrier 106.

The end of the carrier 106 bearing the cutter blade 112 extends through the carrier 92 so that the stationary blade 94 and movable blade 112 are in juxtaposition, as best shown in FIGS. 8 and 13.

In operation, to cut lengths of picket wire W having a desired number of convolutions from a continuous length of picket wire, the advancing movement of the continuous length of picket wire is stopped when a length having the desired number of convolutions has passed by the cutter blades of the shear heads 4 and 6.

An oval convolution of the length of picket wire is upright between the blades of the shear heads when advancing movement of the wire is stopped.

Figure 5:
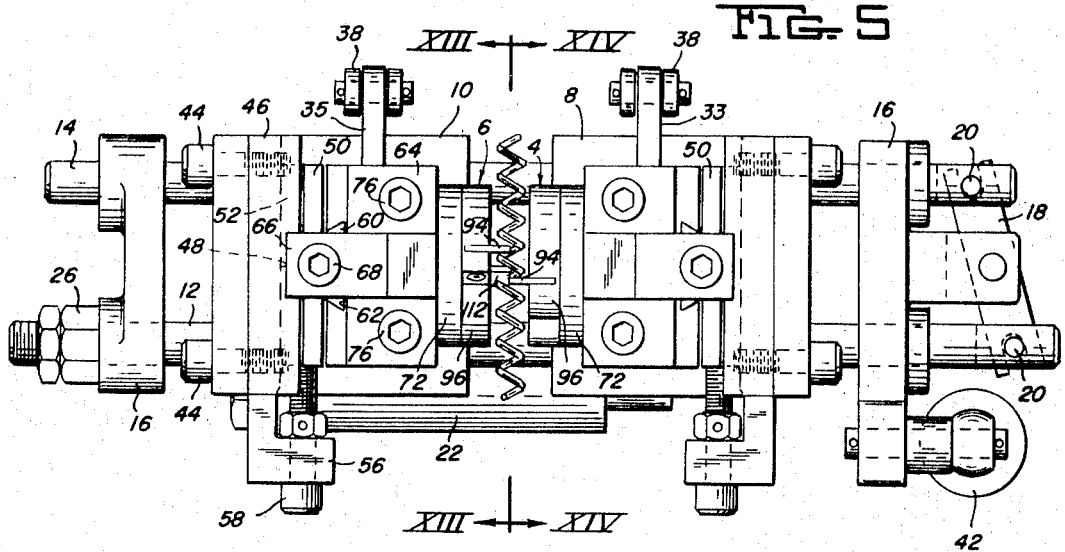
FIG. 5 is a view similar to FIG. 4 but showing the shears in projected position with the cutting blades in engagement with the convolution of picket wire to be cut.
Figure 6:
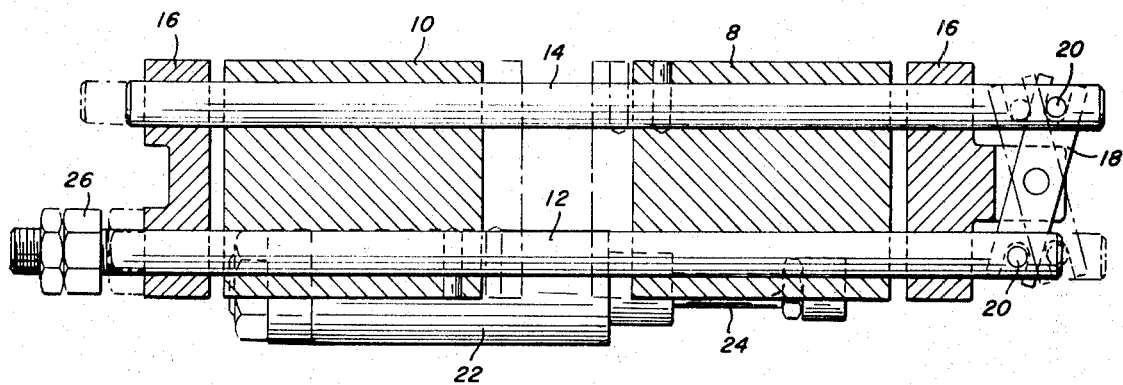
FIG. 6 is a cross-sectional view taken substantially along the line VI—VI of FIG. 3.

After movement of the picket wire has been stopped, cylinder 22 is energized to retract piston rod 24 causing the brackets 8 and 10 to move toward each other thus moving the shear heads 4 and 6 toward the picket wire W to engage it with the respective cutter blades on each shear head. As best shown in FIGS. 5, 13 and 14, the blades of both shear heads engage the same convolution of the picket wire. Then cylinder 42 is energized to rotate shaft 28 and levers 32 and 34 which are connected with levers 33 and 35, respectively, by means of connecting rods 38. Rotation of levers 33 and 35 cause the movable cutter blade carriers in heads 4 and 6 to rotate thereby cutting a major portion of the convolution C out of the picket wire, as best shown in FIG. 1. This cut creates a "tail" end on the completed and cut-away length of the picket wire, and a "head" end on the leading end of the next picket wire length to be cut.

Figure 4:
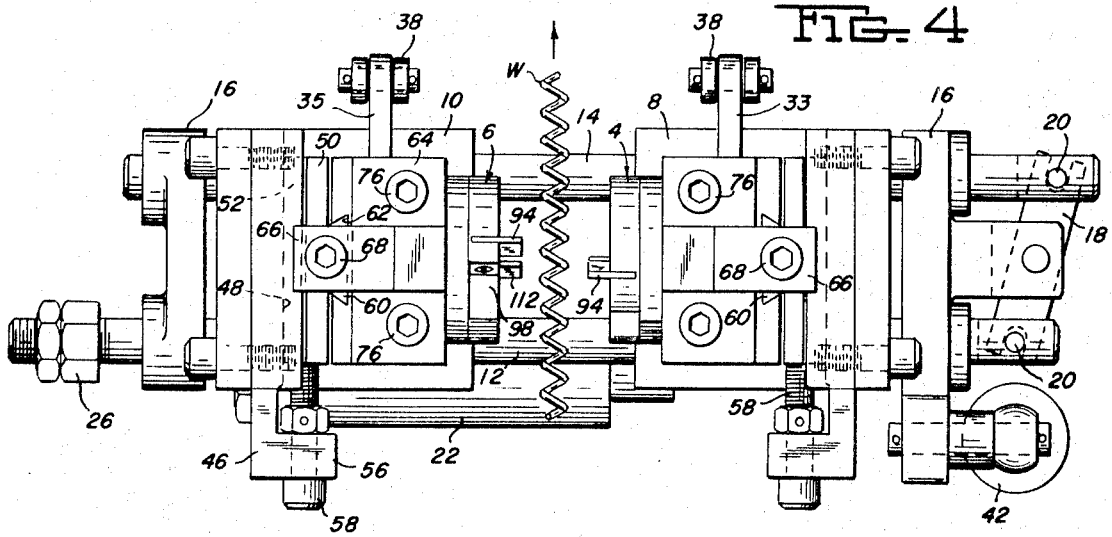
FIG. 4 is a plan view of the apparatus of the invention showing the shear heads in open position retracted from the strand of continuous spirally wound picket wire to be cut.

After the cut has been made, cylinder 42 is energized to return the cutter blades to original position. Then the cylinder 22 is energized to retract the shear heads from the path of the picket wire W, as best shown in FIGS. 3 and 4.

Screw shafts 58, 68 and 76 are adjusted to position the cutters of each shear head properly to accommodate various wire gauges and shapes of convolutions.

While we have shown but one embodiment of our invention, other adaptations and modifications may be made without departing from the scope of the following claims.

We claim:

1. Apparatus for cutting a length of convoluted wire from a continuous strand of said wire and simultaneously forming a tail end on the cut end of said length and a head end on the leading end of said continuous strand from which said length is cut, said tail and head ends being directed in opposite directions, said apparatus comprising a pair of opposed shear heads disposed astride said continuous strand, means mounting said heads for linear movement toward and away from said continuous strand, a rotatable cutting blade and a fixed cutting blade mounted on the leading end faces of said shear heads, the cutting blades on one head being offset from the cutting blades in the other head, the cutter blades being so positioned on their respective heads to engage a common convolution of said continuous strand at opposed points and cut away a portion of said common convolution between said points when said heads are advanced linearly toward said continuous strand and their rotatable cutters rotated relative to their fixed cutters, and means for rotating said rotatable cutters.

2. Apparatus as defined by claim 1 in which said means for mounting said heads comprises an upright frame, a pair of horizontally extending guide rods slidably mounted on said frame in spaced parallel relation, a pair of brackets mounted on said guide rods, one of said brackets being slidably mounted on one of said guide rods and fixedly connected with the other guide rod, the other one of said brackets being slidably mounted on said other guide rod and fixedly connected with said one of said guide rods, and means mounted on said frame and connected with said brackets for moving said guide rods longitudinally in a horizontal plane to move said brackets toward and away from each other, said shear heads being mounted one on each of said brackets.

3. Apparatus as defined by claim 2 including an equalizer link pivotally mounted at substantially its center to said frame and pivotally connected by one end with said one of said guide rods and pivotally connected by its other end with said other of said guide rods for equalizing the movement of said guide rods.

4. Apparatus as defined by claim 2 in which a portion of one of said guide rods projects outwardly of said frame, and an adjustable stop means is mounted on said projecting portion cooperating with said frame to limit movement of said guide rod in the direction in which said brackets are moved toward each other.

5. Apparatus as defined by claim 2 in which said means for moving said guide rods to effect movement of said brackets toward and away from each other is a horizontally disposed fluid pressure cylinder having a piston rod slidably projecting from one end thereof, said cylinder being connected at its head end with one of said brackets, and said piston rod being connected by its projecting end with the other of said brackets.

6. Apparatus as defined by claim 1 including means for adjusting each of said shear heads linearly on its respective bracket.

7. Apparatus as defined by claim 1 in which each of said shear heads includes a main body portion having a substantially cylindrical center bore, each of said bores extending normal to said continuous strand and being open at its end toward said continuous strand and closed at its opposite end, a substantially cylindrical hollow body rotatably fitted in said bore with a portion thereof extending outwardly of the open end of said bore, said cylindrical body having a transverse slot intermediate its ends extending partially around the outer circumference of said member, retaining means in said main body fitting into said slot for locking said cylindrical body from longitudinal movement in said bore, a portion of the circumference of said cylindrical body being cut away remote from said slot to form opposed bearing surfaces, a pair of adjusting screws threaded through said main body and bearing at one end one on each of said bearing surfaces whereby relative adjustment of said screws effects rotational adjustment of said cylindrical body, a tube having a flange at one end disposed in said cylindrical body with said flange abutting the projecting end of said cylindrical body, said flange being rigidly connected with said cylindrical body, a fixed cutting blade disposed in and projecting from the outer surface of said flange, an elongated substantially cylindrical shaft rotatably mounted in said tube, a cutting blade mounted on and projecting from the end of said shaft toward the open end of said bore adjacent said fixed cutting blade, means affixed to said shaft for rotating the same to move the cutting blade attached thereto relative to said fixed cutting blade to effect a cutting operation.

8. Apparatus as defined by claim 7 including a circumferential flange on said shaft adjacent the end thereof remote from its end on which said cutting blade is disposed, said flange abutting the end of said tube remote from the open end of said bore to restrain said shaft from longitudinal movement outwardly of said tube.

9. Apparatus as defined by claim 7 in which said means for rotating said shaft includes a lever rigidly affixed by one end to the end of said shaft remote from the end of said shaft on which said cutting blade is disposed, said main body having an elongated slot therein communicating with the bore thereof, the other end of said lever extending outwardly of said main body through said slot, and means connected with the projecting end of said lever for moving the same to rotate said shaft.

10. Apparatus as defined by claim 9 in which said means for moving said lever comprises a shaft rotatable in said frame, a lever mounted on and projecting from said shaft, a rigid rod connecting the lever on said shaft rotatable in said frame with the lever projecting from said main body, and means connected with said last-named shaft for rotating the same.

11. Apparatus as defined by claim 10 in which said rod connecting said levers is adjustable lengthwise thereby to adjust the motion imparted to the lever projecting from said main body by the lever projecting from said shaft rotatable in said frame.

* * * * *